United States Patent
Yamamoto et al.

(10) Patent No.: US 9,246,167 B2
(45) Date of Patent: Jan. 26, 2016

(54) METHOD FOR FORMING ZINC ALLOY POWDER FOR USE IN ALKALINE BATTERY

(71) Applicant: PANASONIC CORPORATION, Osaka (JP)

(72) Inventors: Kenji Yamamoto, Osaka (JP); Shunsuke Uzuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 85 days.

(21) Appl. No.: 14/104,774

(22) Filed: Dec. 12, 2013

(65) Prior Publication Data

US 2014/0190311 A1    Jul. 10, 2014

(30) Foreign Application Priority Data

Jan. 10, 2013 (JP) ................. 2013-002277

(51) Int. Cl.
| | |
|---|---|
| C22C 18/00 | (2006.01) |
| C22C 18/04 | (2006.01) |
| H01M 4/42 | (2006.01) |
| B22F 9/08 | (2006.01) |
| B22F 9/06 | (2006.01) |
| C22C 1/04 | (2006.01) |

(52) U.S. Cl.
CPC . *H01M 4/42* (2013.01); *B22F 9/06* (2013.01); *B22F 9/082* (2013.01); *C22C 1/0483* (2013.01); *C22C 18/00* (2013.01); *C22C 18/04* (2013.01); *B22F 2009/0888* (2013.01)

(58) Field of Classification Search
CPC ......... C22C 18/00; C22C 18/04; H01M 4/42; B22F 9/082; B22F 9/06
See application file for complete search history.

(56) References Cited

U.S. PATENT DOCUMENTS

| | | | | |
|---|---|---|---|---|
| 2,195,566 | A | * | 4/1940 | Gifford et al. ................ 420/519 |
| 2004/0256033 | A1 | * | 12/2004 | Andoh et al. ................. 148/538 |
| 2006/0008704 | A1 | | 1/2006 | Ebara et al. |
| 2008/0153003 | A1 | * | 6/2008 | Alday Lesaga ............... 429/226 |

FOREIGN PATENT DOCUMENTS

| | | | | |
|---|---|---|---|---|
| BE | 893551 | | * 10/1982 | |
| CN | 1390964 | A | * 1/2003 | |
| CN | 103131898 | A | * 5/2013 | |
| DE | 3238240 | A1 | * 4/1984 | ............. H01M 4/42 |
| JP | 3436495 | B2 | 8/2003 | |
| JP | 2006-040883 | A | 2/2006 | |
| JP | 5102970 | B2 | 12/2012 | |

OTHER PUBLICATIONS

BE Patent No. 893551. Published Oct. 18, 1982. Machine translation.*
Lu, W et al. Patent CN 1390964 A published Jan. 15, 2003. Machine translation.*
Yang, Liu et al. Chinese Patent CN 103131898 A published May 2013. Machine translation.*
Yang, Liu et al. Chinese Patent CN 103131898 A published May 2013. Abstract.*

* cited by examiner

*Primary Examiner* — George Wyszomierski
*Assistant Examiner* — Tima M McGuthry Banks
(74) *Attorney, Agent, or Firm* — McDermott Will & Emery LLP

(57) ABSTRACT

A method for forming a zinc alloy powder for use in an alkaline battery includes: obtaining a zinc molten metal in which zinc is melted; melting a zinc-aluminum master alloy in the zinc molten metal, thereby obtaining an aluminum-contained zinc alloy molten metal; and producing an aluminum-contained zinc alloy powder by powdering the aluminum-contained zinc alloy molten metal.

5 Claims, 1 Drawing Sheet

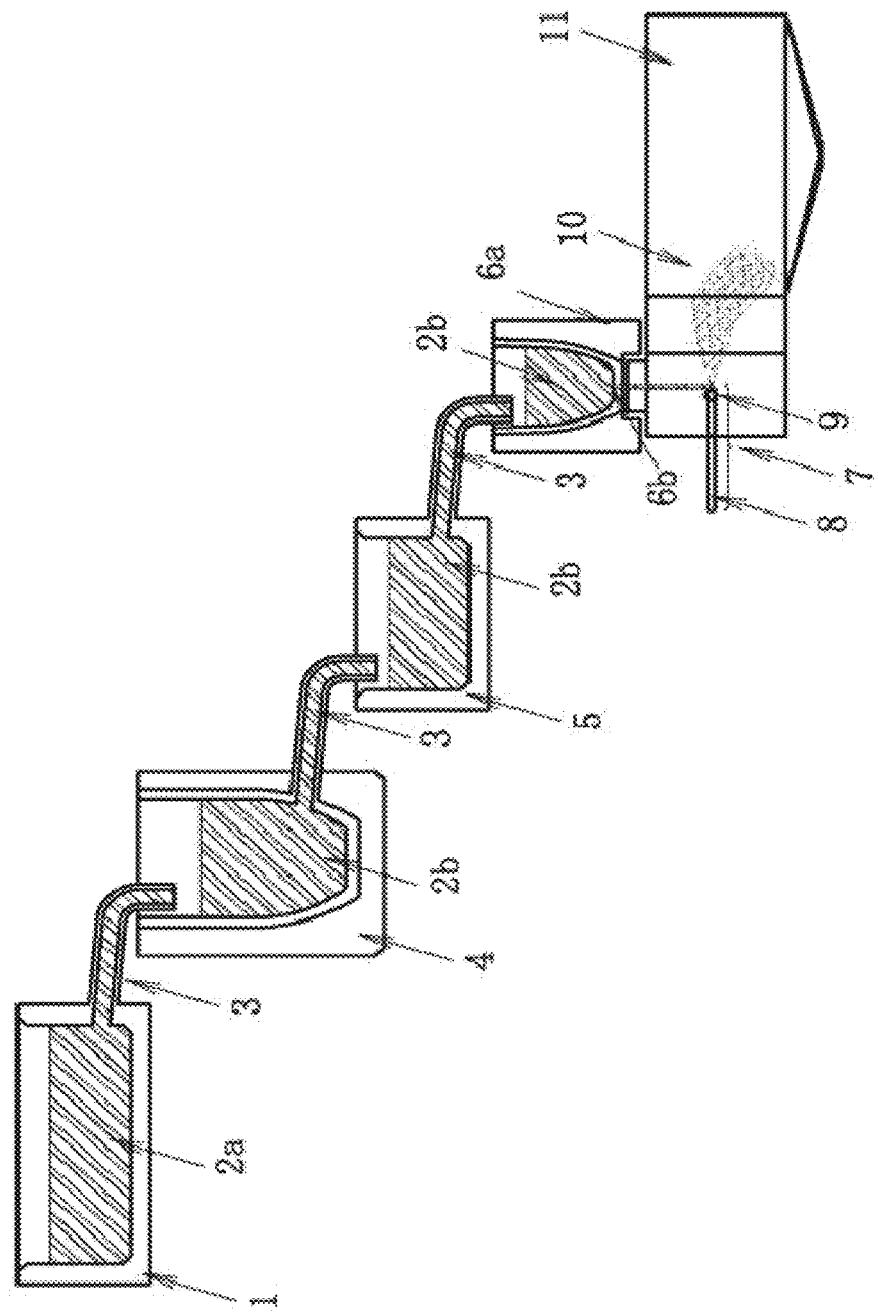

METHOD FOR FORMING ZINC ALLOY POWDER FOR USE IN ALKALINE BATTERY

CROSS-REFERENCE TO RELATED APPLICATION

This application claims priority to Japanese Patent Application No. 2013-002277 filed on Jan. 10, 2013, the entire disclosure of which is incorporated by reference herein.

BACKGROUND

The present disclosure relates to methods for forming a zinc alloy powder as a negative electrode active material of an alkaline battery.

In general, zinc powders as a negative electrode active material of an alkaline battery are alloyed with other metals in view of corrosion resistance. For example, zinc alloy powders with an increased resistance to corrosion which are obtained by adding a metal with a high hydrogen overvoltage, such as indium and bismuth, or adding a metal which can make the powders have smooth surfaces, such as aluminum and calcium, are known.

Many alkaline batteries currently on the market use a zinc alloy powder which contains 0.01-0.1% indium and bismuth by mass and 0.002-0.01% aluminum by mass.

The zinc alloy powder for use in the alkaline batteries may be obtained from a zinc alloy molten metal obtained by mixing and melting metals, i.e., indium, bismuth and aluminum, and zinc (see Japanese Unexamined Patent Publication No. 2006-40883).

The zinc alloy powder for use in the alkaline batteries may also be obtained from a zinc alloy molten metal obtained by dissolving metallic elements, i.e., indium, bismuth, and aluminum, in a zinc molten metal obtained by melting a zinc ingot (see Japanese Patent No. 3436495).

Known techniques for producing a powder by powdering the zinc alloy molten metal include a gas atomization method in which the zinc alloy molten metal is powdered by being atomized with a high pressure gas, and a centrifugal disk atomization method in which the zinc alloy molten metal is powdered by being dispersed using a high-speed rotating disk (see Japanese Patent No. 5102970).

SUMMARY

The zinc as a negative electrode active material of an alkaline battery has a melting point of 419.6° C. and a density of 7.14 g/cm$^3$. On the other hand, the aluminum to be added in the zinc alloy powder for use in the alkaline battery has a melting point of 660.5° C. and a density of 2.70 g/cm$^3$. In other words, the aluminum is a metal less soluble and lighter than the zinc. This causes the following problems in forming an aluminum-contained zinc alloy powder for use in an alkaline battery.

In the case of mixing and melting zinc and aluminum as disclosed in the above-described Japanese Unexamined Patent Publication No. 2006-40883, extra thermal energy and time are necessary in order to dissolve the aluminum whose melting point is higher than a melting point of zinc by 200° C. or more. As the dissolving time passes, oxidation of the aluminum proceeds, and the aluminum is absorbed into dross floating on the surface of the zinc alloy molten metal.

In the case of adding aluminum to the zinc molten metal for dissolution as disclosed in the above-described Japanese Patent No. 3436495, the aluminum having a density less than the density of zinc may float near the surface of the zinc molten metal, and the dissolved aluminum may be easily absorbed into dross on the surface of the molten metal.

In forming aluminum-contained zinc alloy powders used in alkaline batteries, the aluminum having been added to achieve a desired aluminum content is absorbed into dross as described above, and therefore, less aluminum remains in the zinc alloy powders, and the aluminum content may be unstable. Moreover, an excess amount of aluminum must be added to achieve the desired aluminum content.

Since the aluminum is further absorbed into the dross with time, the aluminum content in the zinc alloy molten metal needs to be strictly controlled to maintain a uniform alloy composition.

Particularly in the case where the aluminum content in the zinc alloy powder for use in the alkaline battery is requested to be extremely low, i.e., the order of 0.0001% by mass, close attention needs to be paid in controlling the aluminum content.

The present disclosure is intended to solve the above problems and provides an aluminum-contained zinc alloy powder for use in an alkaline battery in which the aluminum content is stably maintained by a simple method.

A method for forming a zinc alloy powder for use in an alkaline battery according to the present disclosure includes melting a zinc-aluminum master alloy in a zinc-contained molten metal, thereby adding aluminum, and powdering the molten metal.

Specifically, a method for forming a zinc alloy powder for use in an alkaline battery according to the present disclosure includes: obtaining a zinc molten metal in which zinc is melted, melting a zinc-aluminum master alloy in the zinc molten metal, thereby obtaining an aluminum-contained zinc alloy molten metal, and producing an aluminum-contained zinc alloy powder by powdering the aluminum-contained zinc alloy molten metal.

The method for forming the zinc alloy powder for use in the alkaline battery according to the present disclosure has an advantage that the aluminum content can be stably maintained by a simple method.

BRIEF DESCRIPTION OF THE DRAWINGS

FIG. 1 schematically illustrates steps for forming a zinc alloy powder for use in an alkaline battery according to an embodiment of the present disclosure.

DETAILED DESCRIPTION

A method for forming a zinc alloy powder for use in an alkaline battery according to the present disclosure includes melting a zinc-aluminum master alloy in a zinc-contained molten metal, thereby adding aluminum, and powdering the molten metal.

The zinc-aluminum master alloy has a melting point lower than a melting point of aluminum, and a density higher than a density of aluminum. Thus, aluminum can be immediately dissolved and dispersed in the zinc-contained molten metal, and it is possible to reduce aluminum absorbed into dross.

The method for forming the zinc alloy powder for use in the alkaline battery according to the present disclosure has an advantage that the aluminum content can be stably maintained by a simple method.

In the following detailed descriptions, only preferred embodiments of the present disclosure are shown and described, simply by way of illustration but not limitation. As will be realized, the present disclosure is capable of other embodiments and different embodiments, and several details of the present disclosure are capable of modification in various obvious respects, all of which are included in the technical idea of the present disclosure. Accordingly, the drawing and the specification are to be regarded as illustrative in nature, and not as restrictive.

In an embodiment of the present disclosure, the zinc-aluminum master alloy may contain 1-18% aluminum by mass. Preferably, the zinc-aluminum master alloy may contain 1-10% aluminum by mass. The zinc-aluminum master alloy containing aluminum in this range of percentages has a melting point lower than the melting point of zinc alone and a density that is close to the density of zinc alone, due to a eutectic of zinc and aluminum. Thus, the zinc-aluminum master alloy has an advantage that it can be immediately dissolved in the zinc-contained molten metal, and does not easily float in the molten metal, and therefore, aluminum is not easily absorbed into dross.

In an embodiment of the present disclosure, the zinc-aluminum master alloy may contain 4-8% aluminum by mass. A zinc-aluminum master alloy containing approximately 6% aluminum by mass has a melting point (i.e., 381.0° C.) lower than the melting point of a zinc-aluminum master alloy containing aluminum in the other range of percentages. The density of this master alloy is 6.60 g/cm$^3$. For this reason, the zinc-aluminum master alloy containing around 6% aluminum by mass, that is, 4-8% aluminum by mass is preferable.

The zinc-aluminum master alloy may be in the form of wire, rod, a solid piece, or powder, for example, but not specifically limited to these forms.

In another embodiment of the present disclosure, the zinc alloy powder for use in the alkaline battery contain 0.001-0.05% aluminum by mass. In a preferable embodiment, the zinc alloy powder contains 0.002-0.009% aluminum by mass. The zinc alloy powder for use in the alkaline battery according to the present disclosure has an advantage that the aluminum content can be stably maintained in an extremely low aluminum content range, i.e., the order of 0.0001% by mass, and thus, when the zinc alloy powder according to the present disclosure is used in negative electrodes of alkaline batteries which are mass produced and sold, variations in the corrosion resistance are reduced.

In another embodiment of the present disclosure, the zinc alloy powder for use in the alkaline battery contains 0.001-0.05% aluminum by mass. The zinc alloy powder for use in the alkaline battery according to the present disclosure has an advantage that the aluminum content can be stably maintained in an extremely low aluminum content range, i.e., the order of 0.0001% by mass, and thus, when the zinc alloy powder according to the present disclosure is used in negative electrodes of alkaline batteries which are mass produced and sold, variations in the corrosion resistance are reduced.

A zinc-contained molten metal of another embodiment of the present disclosure may preferably contain a metal with a high hydrogen overvoltage, such as bismuth and indium. For example, the zinc-contained molten metal may contain 0.01-0.2% indium by mass, and the zinc-contained molten metal may contain 0.01-0.1% bismuth by mass. These molten metals are powdered to obtain a zinc alloy powder for use in the alkaline battery with superior resistance to corrosion.

Preferably, no mercury is contained in the zinc alloy powder for use in the alkaline battery according to another embodiment of the present disclosure, considering the load on the environment. The above "no mercury is contained" should be understood that no mercury, except mercury as unavoidable impurities, is added. For the similar reason, it is preferable that no lead or no cadmium is contained in the zinc alloy powder.

In another embodiment of the present disclosure, a method for powdering the zinc alloy is not specifically limited, and conventional methods, such as a gas atomization method and a centrifugal disk atomization method, may be used.

In another embodiment of the present disclosure, a method for forming the zinc alloy powder for use in the alkaline battery includes controlling an aluminum content in the zinc alloy powder to $n/1000 \pm n/10000\%$ by mass ($2 \leq n \leq 9$). The method for forming the zinc alloy powder for use in the alkaline battery according to the present disclosure has an advantage that the aluminum content is stably maintained in an extremely low aluminum content range, i.e., the order of 0.0001% by mass.

An example embodiment of the present disclosure will be described with reference to the drawing, but the present disclosure is not limited to the example described below. FIG. 1 schematically illustrates steps for forming a zinc alloy powder for use in an alkaline battery according to an embodiment of the present disclosure.

EXAMPLE

As an embodiment of the present disclosure, a method for forming a zinc alloy powder for use in an alkaline battery (hereinafter may be simply referred to as a "zinc alloy powder") containing 0.02±0.002% indium by mass, 0.01±0.001% bismuth by mass, and 0.005±0.0005% aluminum by mass will be described in detail with reference to FIG. 1.

A 500 kg zinc ingot of 99.99% purity obtained by an electrolytic method was placed in a smelting furnace 1 and was melted at a temperature of 490-530° C., thereby obtaining a zinc molten metal 2a.

The zinc molten metal 2a was guided into a stirring pot 4 maintained at a temperature of 500-520° C. through a gutter 3. After that, a 0.10 kg indium ingot of 99.9% purity, a 0.05 kg bismuth ingot of 99.9% purity, and a 0.459 kg wire made of a zinc-aluminum master alloy containing 6% aluminum by mass were put in the stifling pot 4.

The amount of the zinc-aluminum master alloy to be put in the stirring pot 4 was decided so that the aluminum content in a zinc alloy molten metal 2b would be 0.0055% by mass, considering that not a small amount of aluminum would be absorbed into dross. The time until the zinc-aluminum master alloy would be completely melted was measured.

As the zinc-aluminum master alloy containing 6% aluminum by mass, AL6 zinc alloy wire (having a diameter of 1.0 mm) manufactured by Zinc Excel Corporation was used.

After the zinc-aluminum master alloy was melted, the bottom of the stifling pot 4 was stirred ten times, using a graphite stirring bar, thereby obtaining the zinc alloy molten metal 2b. A zinc oxide film which was formed as dross on the surface of the zinc alloy molten metal 2b was removed using a graphite ladle. The aluminum content in the dross was measured. The zinc alloy molten metal 2b was guided into a holding furnace 5 maintained at a temperature of 500-520° C. through a gutter 3.

The zinc alloy molten metal 2b was supplied into an atomizer pot 6a from the holding furnace 5 through the gutter 3 such that the zinc alloy molten metal 2b in the atomizer pot 6a would be maintained at a uniform level.

The atomizer pot 6a is provided with a hole 6b on the bottom, for supplying the zinc alloy molten metal 2b. The zinc alloy molten metal 2b was dropped through the hole 6b at a speed of 250 kg per hour, using gravity. Compressed air from which moisture had been removed beforehand and which had been processed to have a dew-point temperature of −50° C., was supplied through a transfer pipe 8 of an atomizer 7 and was atomized from an atomizer nozzle 9, and the zinc alloy molten metal 2b was transformed into a zinc alloy powder 10 in a canister 11 by being atomized with the compressed air. The grain size of the obtained zinc alloy powder 10 was controlled to be in a range of 30-200 mesh by a grading machine.

The zinc alloy powder 10 was sampled every 10 minutes until 60 minutes from the start of atomization of the zinc alloy molten metal 2b, and the aluminum contents of these samples were measured.

A conventional method will be described below using FIG. 1. Similar measurements and processes as in the above example had been conducted to obtain a zinc alloy powder 10, except that a 0.045 kg aluminum ingot, in place of a wire made of a zinc-aluminum master alloy, was put in the zinc alloy molten metal 2b in the stirring pot 4.

The amount of the aluminum ingot to be put in the stifling pot 4 was decided so that the aluminum content in the zinc alloy molten metal 2b would be 0.0090% by mass, because according to the conventional method, much amount of aluminum is absorbed into dross.

Table 1 shows the measurement results obtained in the example and the conventional example.

TABLE 1

| | | EXAMPLE | CONVENTIONAL EXAMPLE |
|---|---|---|---|
| FORM OF ALUMINUM ADDED | | ZINC-ALUMINUM MASTER ALLOY (1) (ALUMINUM: 6% BY MASS) | ALUMINUM INGOT (2) |
| AMOUNT OF ALUMINUM ADDED | | 0.0055% BY MASS | 0.0090% BY MASS |
| TIME TAKEN UNTIL (1) OR (2) IS COMPLETELY MELTED | | 4 MINUTES | 32 MINUTES |
| ALUMINUM CONTENT IN REMOVED DROSS | | 0.0057% BY MASS | 0.0143% BY MASS |
| ALUMINUM CONTENT IN ZINC ALLOY POWDER | START | 0.0051% BY MASS | 0.0049% BY MASS |
| | 10 MINUTES LATER | 0.0050% BY MASS | 0.0038% BY MASS |
| | 20 MINUTES LATER | 0.0049% BY MASS | 0.0034% BY MASS |
| | 30 MINUTES LATER | 0.0050% BY MASS | 0.0029% BY MASS |
| | 40 MINUTES LATER | 0.0051% BY MASS | 0.0025% BY MASS |
| | 50 MINUTES LATER | 0.0049% BY MASS | 0.0024% BY MASS |
| | 60 MINUTES LATER | 0.0050% BY MASS | 0.0021% BY MASS |

As apparent from the result of the example shown in Table 1, a zinc-aluminum master alloy containing 6% aluminum by mass could be dissolved in the zinc alloy molten metal in a short time, i.e., four minutes.

The short-time dissolution allows aluminum to diffuse immediately, reduces oxidation of the aluminum, and reduces the amount of aluminum absorbed into dross.

For these reasons, the amount of aluminum contained in the zinc alloy powder did not vary with time from the start of atomization of the zinc alloy molten metal, and the amount of aluminum could be stably controlled.

However, in the conventional example, the time from the addition to the dissolution of the aluminum ingot was much longer, i.e., 32 minutes, compared to the example. During that period, the aluminum ingot floated near the surface of the zinc alloy molten metal.

The aluminum was therefore absorbed into dross, resulting in a reduction in the aluminum content in the zinc alloy molten metal. Further, since the excess dissolving time was necessary, oxidation of the aluminum proceeded, and more aluminum was absorbed into dross. As a result, the aluminum content in the zinc alloy powder was reduced with time from the start of atomization of the zinc alloy molten metal.

It is clear from these results that by using a zinc-aluminum master alloy it is possible to form a zinc alloy powder for use in an alkaline battery in which the aluminum content can be stably maintained in an extremely low aluminum content range, i.e., the order of 0.0001% by mass.

A zinc alloy powder for use in an alkaline battery obtained by a method of the present disclosure has superior resistance to corrosion, and is suitable for use in a negative electrode of the alkaline battery.

What is claimed is:

1. A method for foil ling a zinc alloy powder for use in an alkaline battery, comprising:
    obtaining a zinc molten metal in which a zinc ingot is melted;
    melting a zinc-aluminum master alloy in the zinc molten metal, thereby obtaining an aluminum-contained zinc alloy molten metal; and
    producing an aluminum-contained zinc alloy powder by powdering the aluminum-contained zinc alloy molten metal wherein
    the zinc-aluminum master alloy contains 1-18% aluminum by mass, and
    a melting point of the zinc-aluminum master alloy is lower than a melting point of the zinc, and density of the zinc-aluminum master alloy is greater than density of the aluminum.

2. The method of claim 1, wherein the zinc-aluminum master alloy contains 1-10% aluminum by mass.

3. The method of claim 1, wherein the zinc-aluminum master alloy contains 4-8% aluminum by mass.

4. The method of claim 1, wherein the zinc alloy powder contains 0.001-0.05% aluminum by mass.

5. The method of claim 1, wherein the zinc alloy powder contains 0.002-0.009% aluminum by mass.

\* \* \* \* \*